United States Patent
Schulz et al.

(10) Patent No.: US 6,687,681 B1
(45) Date of Patent: Feb. 3, 2004

(54) METHOD AND APPARATUS FOR TAX EFFICIENT INVESTMENT MANAGEMENT

(75) Inventors: David W. Schulz, Mequon, WI (US); John M. Blaser, Mequon, WI (US); Daniel Patrick Brown, Wauwatosa, WI (US); Todd Hanson, Thiensville, WI (US)

(73) Assignee: Marshall & Ilsley Corporation, Milwaukee, WI (US)

( * ) Notice: Subject to any disclaimer, the term of this patent is extended or adjusted under 35 U.S.C. 154(b) by 0 days.

(21) Appl. No.: 09/322,412

(22) Filed: May 28, 1999

(51) Int. Cl.[7] .............................................. G06F 17/60
(52) U.S. Cl. .......................................... 705/36; 705/37
(58) Field of Search ............................ 705/36, 37, 35, 705/39

(56) References Cited

U.S. PATENT DOCUMENTS

| | | | | | |
|---|---|---|---|---|---|
| 5,497,317 A | * | 3/1996 | Hawkins | ...................... | 705/35 |
| 5,761,442 A | * | 6/1998 | Barr | ............................. | 705/36 |
| 5,806,049 A | * | 9/1998 | Petruzzi | ...................... | 705/36 |
| 5,819,238 A | * | 10/1998 | Fernholz | ...................... | 705/36 |
| 6,029,146 A | * | 2/2000 | Hawkins | ...................... | 705/35 |
| 6,115,697 A | * | 9/2000 | Gottstein | .................... | 705/35 |
| 6,161,098 A | * | 12/2000 | Wallman | ..................... | 705/36 |
| 6,278,983 B1 | * | 8/2001 | Ball | ........................... | 705/39 |
| 6,393,409 B2 | * | 5/2002 | Young et al. | ................. | 705/37 |

FOREIGN PATENT DOCUMENTS

| | | | | |
|---|---|---|---|---|
| JP | 56-31158 | * | 3/1981 | ............... 705/36 X |

OTHER PUBLICATIONS

CPA Journal artilce by Robert Willens entitled, "IRS broadens the definition of wash sales: can Cottage Savings carry the day? note the discussion of wash sale rule changes and the effects on investing", v62, n7, p48, Jul., 1992.*

Chase (Manhattan Private Bank)—Vogel Consulting Group, S.C., Chase Tax–Efficient Portfolio (TEP), pp. 5–11, Dec. 5, 1998.

* cited by examiner

Primary Examiner—Richard Chilcot
(74) Attorney, Agent, or Firm—Reinhart Boerner Van Deuren s.c.

(57) ABSTRACT

A method and apparatus for automatically managing investment portfolios to substantially track a selected index and to automatically harvest tax losses is disclosed. Preferably, the system comprises an accounting system for maintaining tax lot information for individual accounts, an optimization system for rebalancing each account to substantially model the index and for harvesting tax losses, and a trading system for executing trades. Each investor owns the securities in his account, and therefore, harvested losses can be used to offset capital gains. The period between successive optimization procedures is selected to avoid application of the internal revenue service wash sale rules.

18 Claims, 3 Drawing Sheets

METHOD AND APPARATUS FOR TAX EFFICIENT INVESTMENT MANAGEMENT

BACKGROUND

The present invention relates to a method and apparatus for managing investment portfolios. More particularly, the present invention relates to a method and apparatus for automatically managing an investment portfolio comprising a plurality of securities modeled on an index and for actively managing tax lots for individual investors.

One common goal of many investors today is diversification of financial holdings to minimize financial risk while pursuing returns which substantially meet or exceed the performance of indexes such as the Standard and Poor's 500 (S&P 500). Consequently, there are a number of financial products available today which provide a means for both small and large investors to easily diversify their holdings. Among these are mutual funds, annuities, and individually managed accounts. While all of these products provide the desired diversification, however, they suffer from disadvantages in terms of the cost associated with managing accounts, tax efficiency, or both.

Mutual funds are one common means for providing a diversified portfolio to investors. Mutual fund investments, however, are among the least tax efficient financial products in the marketplace, and are particularly unsuitable for medium to high net worth individuals because mutual funds cannot distribute losses. Therefore, investors can receive a taxable distribution, resulting from capital gains allocated among holders of the fund, even if they have a net loss in the investment in the fund. Furthermore, due to accumulated but undistributed capital gains in a fund, new investors may assume a tax deferred liability upon investing in the fund. Mutual funds, therefore, are not suitable investments for investors who require tax efficient investment performance. Furthermore, the performance of such funds frequently lag the performance of indexes such as the S&P 500, since performance is highly dependent on the skill of the manager.

Index funds are a subset of mutual funds designed to track the performance of an index such as the S&P 500. Generally, there are two types of index funds: passive index funds and enhanced index funds. Passive funds generally include all of the securities which comprise the index, weighted to match their weight in the index. These investment funds, therefore, track the performance of the index. In enhanced index funds, a fund manager selects a subset of the securities found in the index and determines the weighting of the various securities in the fund. Rather than matching the performance of the fund, the fund manager seeks to exceed the performance of the fund. Both of these types of funds suffer from the same disadvantages, in terms of tax advantages, as mutual funds. Tax losses associated with the purchase and sale of individual securities held within the fund cannot be allocated among the investors. Furthermore, in the case of enhanced index funds, the performance of the fund is greatly affected by the performance of the fund manager.

Annuities offer another means for diversifying financial holdings. However, while taxes are deferred for annuity holders, annuities also suffer from disadvantages in terms of tax losses. Specifically, when an annuity is eventually converted, all of the capital gains generated are taxed as ordinary income. In many cases, the tax rate on ordinary income is higher than the capital gains tax which would have been paid on the investment.

Separately established individual accounts offer a means to diversify and to efficiently manage tax losses. However, due to the management resources which must be devoted to such accounts, the brokerage costs, and minimum purchase levels, costs are often prohibitive to all but a few wealthy investors. Individual accounts which seek to replicate an index fund are particularly difficult for small-to-medium net worth investors, since full replication of such an index fund in a manner allowing trading efficiencies requires a minimum investment, at present rates, of over a million dollars. For individual accounts that do not replicate an index, the effectiveness of the accounts depends heavily on the skill of the individual manager. Individually managed accounts often do not meet the performance of the S&P 500.

There remains a need, therefore, for a financial investment product that can provide a grossreturn that substantially tracks the returns of a selected index fund, while minimizing taxable gains through efficient use of individual tax lots and minimizing management costs. Preferably, this financial investment product would provide a means for small to medium sized investors to gain the financial advantages of both diversification and (active tax management) tax loss harvesting.

It is therefore an object of the invention to provide a financial investment product that provides diversified investments and tax loss harvesting for small to medium sized investors.

It is another object of the invention to provide an automated investment product for systematically harvesting tax losses.

It is yet another object of the invention to provide an automated investment product for small to medium investors for systematically rebalancing an investment portfolio to track an index fund.

SUMMARY OF THE INVENTION

The present invention provides a method and apparatus for automatically passively managing an individual investment portfolio for each of one or more investors while actively managing tax lots. An individual portfolio modeling an index is established for each investor, such that each investor owns each of the securities in his or her individual account. Because the securities are owned by the individual investor, losses can be harvested to offset gains for tax purposes. The investment portfolio is preferably periodically rebalanced to substantially model the selected index, as will be explained more thoroughly below.

Periodically, preferably at a time exceeding the minimum interval required by internal revenue service wash sale rules, each of the securities in the investment portfolio are automatically evaluated for tax loss harvest purposes. For each tax lot, the difference between the present market value of the security and a past historical value of the security is calculated and compared to a predetermined tax loss threshold. If the difference meets or exceeds the tax loss threshold, the security is automatically sold to provide tax losses for offsetting gains in the portfolio.

The investment portfolio is also automatically periodically rebalanced based on a capitalization weight parameter and an index balance parameter. Preferably, the capitalization weight parameter is determined such that each portfolio contains all of the major holdings of the index. Based upon their respective weight in the index, additional securities are purchased to provide an appropriate industry diversification, substantially the same as the actual holdings in the index fund. Rebalancing assures continued tracking of the index fund.

Trades of a specific security necessary to harvest tax losses or rebalance individual accounts are combined with similar trades for other accounts into a single block trade. Brokerage costs are shared among the individual investors, thereby decreasing the costs for managing the accounts. Upon completion of a trade, the brokerage fees and tax losses are allocated to each individual account. As trades are executed, purchased securities are stored in tax lots, wherein each tax lot associates the number of units of a given security purchased with the value of the security on the day of purchase. Therefore, each individual portfolio may include multiple tax lots of the same security purchased at different times, with a different base purchase value that is used as a comparison for tax harvesting purposes.

The rebalancing, tax loss harvesting, and trading functions are preferably performed automatically by computerized systems. Preferably, individual portfolios are stored and maintained by an automated accounting system. The rebalancing and tax loss harvesting functions are controlled by a second computer which automatically accesses external security exchange information on a daily basis, determines tax loss harvest securities and rebalance securities, and determines appropriate trades. Trading is automatically conducted by a trading computer, which automatically combines the trades from a number of portfolios to minimize brokerage fees, as described above, and electronically submits trades to the appropriate trading organization. Each of these computer systems is coupled to at least one of the other systems through a data link or bridge which allows for information to be transmitted electronically from system to system, thereby eliminating the need for human intervention in the control of the accounts. Although a system comprising a number of separate specific-purpose computers has been described, it will be apparent to one of ordinary skill in the art that the entire system could be embodied in a single software package and controlled by one general purpose computer, and that various functional blocks could be combined in different ways than as described above without departing from the invention.

Other advantages and features of the invention, together with the organization and manner of operation thereof, will become apparent from the following detailed description when taken in conjunction with the accompanying drawings wherein like elements have like numerals throughout the drawings.

DETAILED DESCRIPTION OF THE PREFERRED EMBODIMENTS

Figure 1:
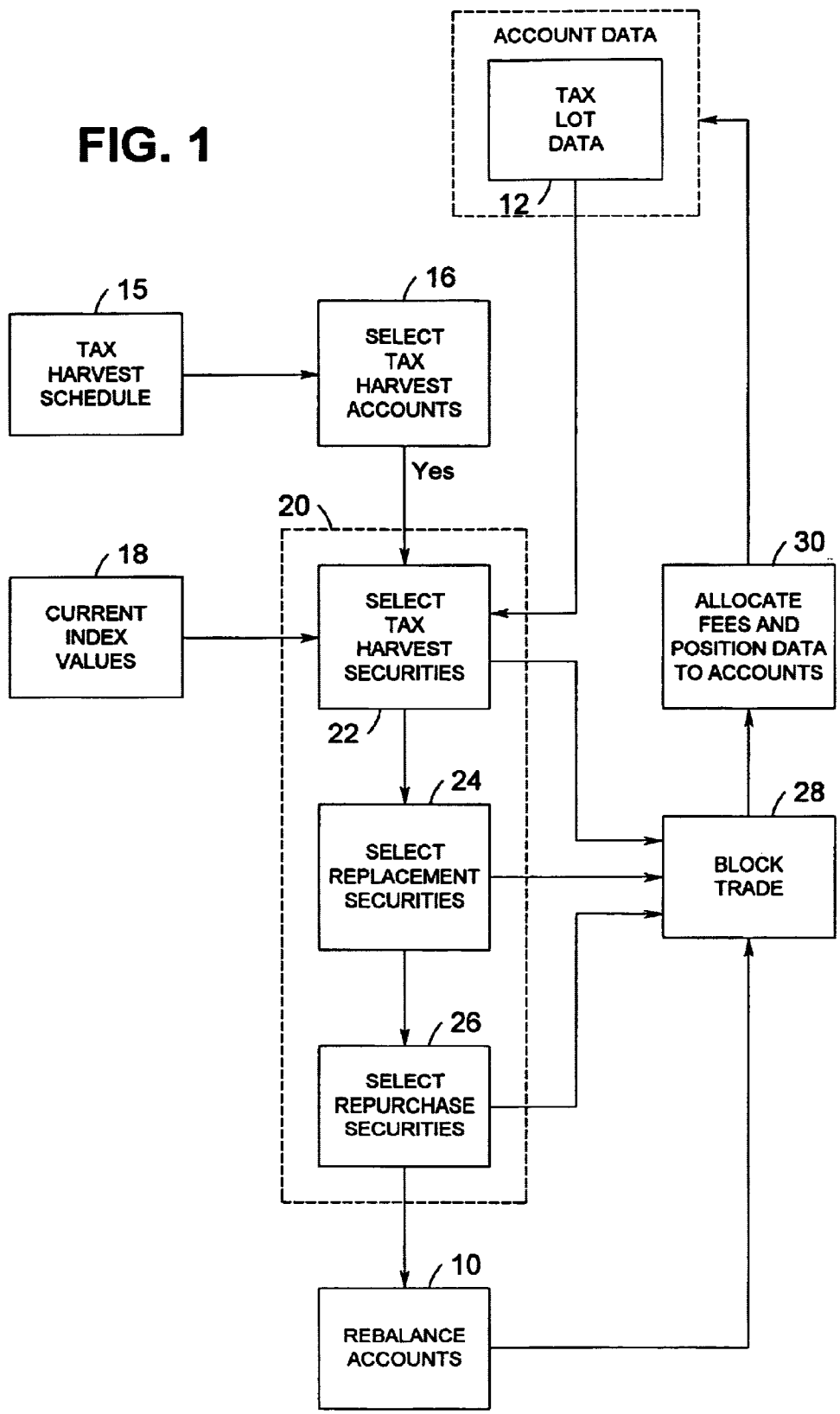
FIG. 1 is a block diagram showing one embodiment of the present invention.

Referring now to the Figures, and more particularly to FIG. 1, a block diagram representing the general method employed to automatically provide a tax efficient portfolio in accordance with the present invention is shown. Generally, the method of the present invention comprises the following steps: (1) establishing individual accounts for each investor; (2) automatically selecting among the individual accounts for accounts which are ready for tax loss harvesting; (3) automatically harvesting tax losses in the selected accounts; (4) automatically rebalancing each account to track a selected index; (5) executing block trades as necessary; and (6) automatically allocating fees and position data to each of the individual accounts. Each of these steps is defined more fully below.

Referring again to FIG. 1, individual accounts are initially established for each of a number of investors (Step 10). Each individual account is modeled on an index fund (preferably the S&P 500) to substantially track the performance of the index fund, while allowing for accounts which are significantly smaller than would be required if each individual investor owned all of the securities required to replicate the index. Preferably, each account includes all of the securities in the index above a given capitalization weight, i.e. each of the top 70 to 80 securities by capitalization weight, in the relative weight that they are held in the index. At present market values, this goal can be accomplished by including each of the securities with a minimum position size greater than 0.30% in each individual portfolio. It will be apparent to one of ordinary skill in the art that the number of securities held is variable with the selected position size and market conditions. Furthermore, the position size is a variable that can be independently selected depending on the desired modeling characteristics.

Selecting securities based solely on capitalization weight, however, distorts industry diversification in the portfolio, which may cause the modeled portfolio to act differently than the index itself, thereby causing tracking error. To prevent this error, additional securities are purchased to provide an industry diversification which is substantially similar to the industry diversification of the index as a whole.

Figure 2:
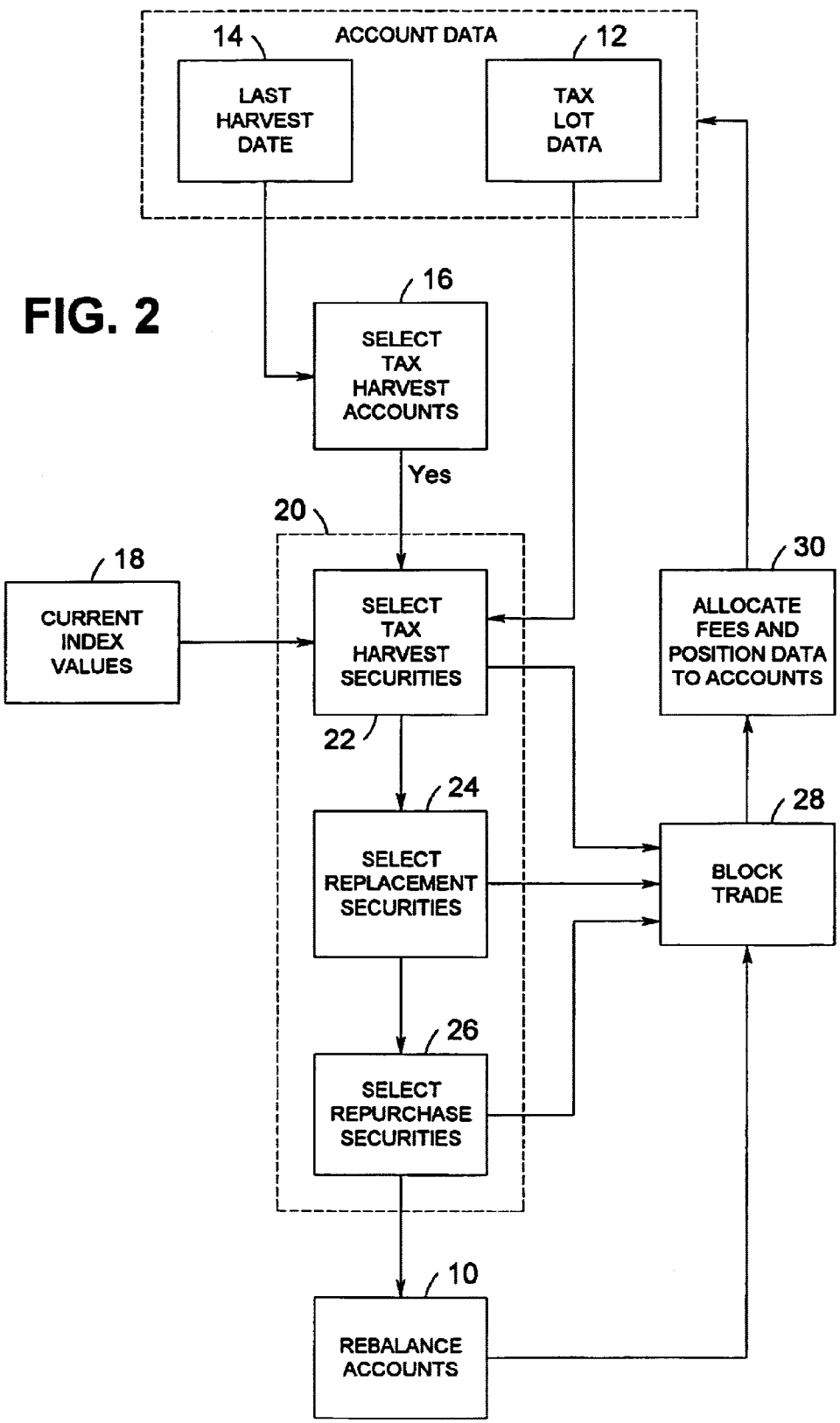
FIG. 2 is a block diagram showing an alternative embodiment of the present invention.

Upon completion of each portfolio, the number of shares and the present value of each individual security is stored as an individual tax lot (Step 12). The stored value ("stored historical loss value") is used as a reference point for comparison to the present value of the security during the tax loss harvest process defined below. Preferably, each new portfolio is added to a group of portfolios which will be optimized (processed for rebalancing and tax loss harvesting) on the same day. A predetermined schedule, based on the internal revenue service wash sale rules, determines when each group of accounts is rebalanced and tax losses are harvested (Step 15). Alternatively, (FIG. 2) the date the account was established can be stored as an initial benchmark for determining when the account should be rebalanced and evaluated for tax loss harvest purposes (the "last loss harvest date", Step 14). In this embodiment, the last harvest date is updated upon completion of each successive tax loss harvest. In both embodiments, the delay between successive tax loss harvest operations is at least as long as the time period required by Internal Revenue Service wash sale rules, as defined below.

Referring, again, to FIG. 1, periodically, and preferably daily, a group of individual accounts is selected for rebalancing and tax loss harvesting based on the predetermined schedule (Step 16). Preferably, the period between successive tax loss harvest operations is established based on internal revenue service wash sale rules, as presently defined in 26 U.S.C. Section 1091, or for such period of time to prevent an allowance of loss recognition resulting from the sale of a security. Presently, this period is established as a minimum of 31 days. Therefore, to effectively harvest tax losses, each individual account is evaluated for tax losses periodically at a minimum of 31 days. Although a tax loss harvest period of 31 days is described, it will be apparent to one of ordinary skill in the art that any time frame greater than the time frame established by the wash sale rules can be used.

To harvest tax losses, it is necessary initially to determine the present market value of each security in the modeled index (Step 18). These values provide a comparison to the stored historical loss value for each tax lot in each individual account for tax loss harvest purposes. Present market value information is preferably provided by electronically downloading data from a financial service provider, although market information could be obtained from the internet, entered manually, or obtained in other known ways.

Once the present market values of each of the securities in the account are known, a comparison can be made to each stored historical loss value to determine which of the tax lots for each individual account should be harvested for losses (Step 20). The present market value of each security in each individual account is compared to the stored historical loss value of the tax lot for that security. The difference in value is compared to a predetermined loss threshold, which is preferably selected based on the following factors: (1) tax benefit to the account holder; (2) transaction costs to the individual account holder; and (3) tracking error of the index. Under present market conditions, the tax loss threshold has been experimentally selected in a range between approximately 10% and 15%, and most preferably, at a 15% loss when the present market value is compared to the stored loss value. However, the optimum value may vary depending on present market conditions, the goals of the individual investor, or other factors. In some cases, for example, an investor may prefer to maximize tax benefit regardless of tracking error or transactional costs. In this case, a different threshold value may be appropriate.

Upon completion of the tax loss harvest evaluation (Step 22), a list of each of the securities to be sold in each account ("tax loss harvest securities") is stored for purposes of making a block trade, as will be defined below. Furthermore, an evaluation is performed to determine which securities to purchase ("replacement securities") to replace the tax loss harvest securities during the wash sale delay period (Step 24). The replacement securities are preferably selected to maintain the appropriate industry balance in the account after the tax loss harvest securities are sold. A list of these securities is also compiled for purposes of making a block trade. A third list of securities, comprising those securities which were sold for tax loss harvest purposes during the last tax loss harvest evaluation ("repurchase securities") (Step 26) is also compiled for purposes of a block trade. Preferably, only "core" securities (those selected based on their capitalization weight) which are sold for tax loss harvesting are repurchased. Other securities are repurchased only if selected in the rebalancing procedure.

Referring again to FIG. 1, upon completion of the tax loss harvest procedure, all of the selected accounts are rebalanced based on the capitalization weight and industry balance parameters as described in Step 10, above. Rebalancing assures that each individual account will continue to track the performance of the index. The securities to be traded from individual accounts for rebalancing purposes are also compiled to provide a block trade.

Upon completion of the rebalancing steps, a block trade (Step 28) comprising each of the securities designated to be sold from each account is performed, along with a block purchase of each security to be bought. Upon completion of the trade, account position data is allocated to each account. The brokerage fees for the block trade are allocated among each of the accounts on a pro rata basis (Step 30). As noted above, the account data preferably includes tax lots, where the tax lots track both the amount of each security purchased and the purchase price. Therefore, if more than one purchase is made for a given security, multiple tax lots with varying tax bases will be stored. Tax harvest analyses will be performed separately for each tax lot.

Although specific embodiments have been shown and described, it will be apparent to one of ordinary skill in the art that a number of different embodiments could provide a similar function. Generally, the present invention comprises the steps of establishing individual accounts modeled on an index to substantially track the performance of the index. Preferably, the modeled accounts comprise a reduced set of securities such that each investor owns a subset of the securities in the index, thereby enabling small to medium-sized investors the opportunity to purchase all of the securities in the modeled account. Because the investor individually owns each security, tax losses realized from selling securities can be used by each investor, consistent with applicable tax laws, to offset realized capital gains in the account and ordinary income or gains outside of the account. Furthermore, block trading minimizes the brokerage fees for each investor, thereby decreasing the cost of managing each account. Periodically automatic tax loss harvesting and rebalancing of the account minimizes the amount of human intervention required, thereby further reducing costs by reducing management fees, and reducing errors which can be introduced by the decisions of account managers. Therefore, the present invention makes it possible for small to medium-sized investors to invest in tax efficient accounts which substantially track an index. Tax management is preferably active, while the management of the securities held in the account is passive.

Furthermore, although the tax loss harvesting and account rebalancing has been shown in a specific order, the order is for illustrative purposes only. It will be apparent to one of ordinary skill in the art that the tax loss harvesting and account rebalancing functions could be performed in any of a number of ways, and is mainly dependent on the design or selection of the rebalancing or optimization software. For example, although the tax loss harvest procedure is shown prior to the rebalancing procedure, this order could be reversed.

Figure 3:
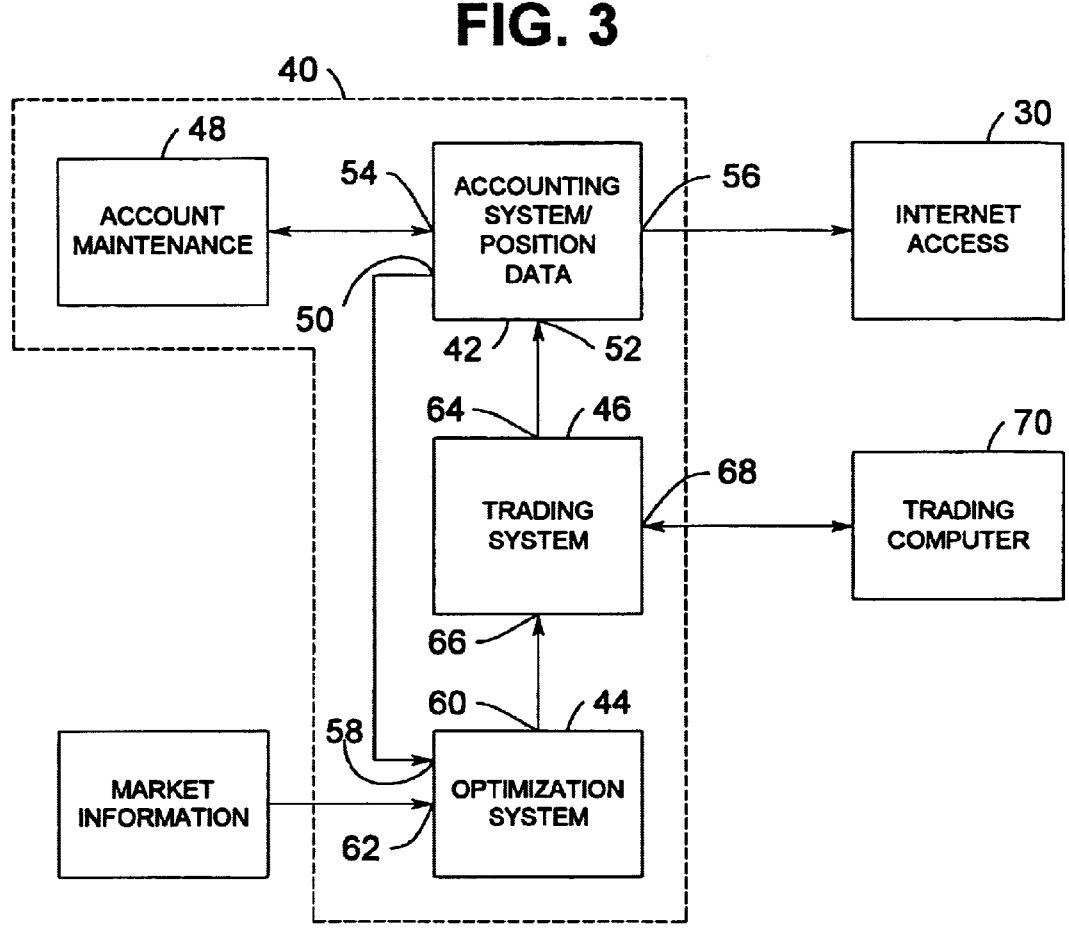
FIG. 3 is a system diagram of one embodiment of an apparatus constructed in accordance with the present invention.

Referring now to FIG. 3, a system overview of a tax efficient investment system constructed in accordance with one preferred embodiment of the present invention is shown at 40. Generally, the present invention comprises a computing system with the following modules: (1) an accounting system 42 for calculating and maintaining account position data; (2) an optimization system 44 for harvesting tax losses of individual accounts and for optimizing the accounts to track the selected index; and (3) a trading system 46 for compiling and executing selected block trades. The tax efficient investment system 40 preferably further comprises an account maintenance system 48 which provides an interface for account managers or users to enter or modify account information. Preferably, communications between these various systems are provided through electronic communication ports coupled to each system. The communication links are preferably provided over a local area network, but could be provided via any type of modem connections, through wide area networks, via internet or e-mail communication links, or through a number of different hard wired or wireless communication links. Although the communications links are described below in terms of information transmitted to or from a given system, it will be apparent to one of ordinary skill in the art that all of these communications links can be bi-directional, and that a number of different types of information can be transmitted between the various systems.

The accounting system 42 preferably comprises a general purpose main frame computer including a communications port 50 for transmitting data to the optimization system 44, a communications port 52 for receiving data from the trading system 46, a communications port 54 for transmitting information to and receiving information from the account maintenance system 48, and a communications port 56 for providing access to third parties. The accounting system 42 further includes a memory storage component for maintaining account position data, historical transaction information, tax lots for individual securities, and past value pricing information for tax loss harvesting purposes. Software in the accounting system provides communications between the various other components of the system, and maintains the individual accounts. In particular, the accounting system 42 allocates position data to each individual account, allocates tax losses to individual accounts, and allocates brokerage fees among the individual accounts. The communications port 56 can be coupled to any of a number of external communication links including local and wide area networks, modem links, and other devices to provide online, real-time access to information. Preferably, the output port 56 is coupled to an internet link which allows users and brokers easy access to account information. Although a general purpose mainframe computer has been described, it will be apparent to one of ordinary skill in the art that any number of different types of computing devices could provide a similar function. Furthermore, the various functions provided by the accounting system could be provided by a number of separate computing devices.

The account maintenance system 48 preferably comprises an input terminal which may be a personal computer, a terminal coupled to the accounting system 42, a remote personal computer, or any of a number of local or remote input devices including telecommunication devices, fax input devices, scanners, etc. The account maintenance system provides an interface for investment counselors or users to enter and modify account data for individual accounts. Information can be directly entered by a user or downloaded from a remote location.

The optimization system 44 is preferably provided on a network server but could also be provided by any of a number of computing devices as will be apparent to those of ordinary skill in the art. Preferably, the optimization system 44 comprises at least a communications port 58 for receiving position and tax lot data from the accounting system 42, a communications port 60 for transmitting trade information to the trade system 46, and a communications port 62 for receiving current market information from an external service provider, or other source. Software in the optimization system 44 provides the functions of rebalancing the individual portfolios to track the selected index, selecting securities for tax loss harvesting, and providing trade information to the trading system 46. Software in the optimization system 44 also provides communications to the accounting system 42, the trading system 46, and the external service provider through the input and output ports described above. In one highly preferred embodiment of the invention, the optimization system 44 is provided by the Equator optimization software from Wilshire Associates Incorporated, modified to provide communications links to the accounting system 42 and trading system 46. The Equator system, or other selected optimization system, preferably models and tracks the S&P 500. However, it will be apparent to those of ordinary skill in the art that any of a number of known indexes including the S&P 400, Russell 2000, S&P 600, etc., could also be used as the basis for the system. Furthermore, although the Equator optimization software is preferred, the optimization software could also be provided by other software packages or by specially-designed proprietary software.

The trading system 46 is also preferably provided on a network server. The trading system 46 comprises a communications port 64 for coupling the trading system 46 to the accounting system 42, a communications port 66 for receiving information from the optimization system 44, and a communications port 68 for coupling the trading system 46 to an external trading system, such as a DOT trading interface 70. In a highly preferred embodiment, the trading system comprises the LandMark Electronic Trading Module, developed by LongView Group, wherein the software has been modified to provide communication links with the accounting system 42 and the optimization system 44. However, any software package which provides a trading interface, or proprietary software could also be used.

In operation, individual account information is preferably entered into an account maintenance system 48 coupled to the accounting system 42, as described above. The initial account data is transmitted to the optimization system 44 to establish an individual portfolio. The optimization system 44 determines the securities to be purchased for a given account based on the capitalization weight of each security in the index and an industry balance parameter. As explained above, each account preferably includes all of the securities having a capitalization weight above a predetermined threshold value, in proper proportion to their representation in the index. The remaining securities in the account are selected by the optimization system 44 to provide an industry balance equivalent to that of the index as a whole. After the securities in the system are selected, security purchase information is transmitted to the trading system 46, which in turn purchases the selected securities. The account position data is then transmitted from the trading system 46 to the accounting system 42 and stored in a memory component of the accounting system 42, along with an initial account opening date. The accounting system 42 also maintains historical transaction data, including the initial last harvest date as defined above. This data is stored for use by the optimization system 44 in calculating tax losses for tax loss harvesting purposes, as will be described below.

Periodically, and preferably on a daily basis, selected accounts are evaluated. Individual account holdings will be rebalanced to assure that the accounts will model the performance of the index. The selected accounts are also harvested for tax losses, consistent with time frames to avoid application of internal revenue service wash sale rules. Preferably, a database identifying groups of individual accounts to be rebalanced is maintained, based on the opening date of the account. A predetermined schedule establishes when the account is to be rebalanced. The schedule may be maintained by the accounting system 42, the optimization system 44, or an external system. Alternatively, the accounting system 42 can maintain a database including the last date on which each of the individual accounts was last evaluated for tax loss harvesting (the last harvest date, as defined above). The accounting system 42 can use this data to determine when each account should be evaluated for tax loss harvesting purposes.

The rebalancing process includes again evaluating the securities held in the index based on capitalization weight, and trading securities to assure that the industry balance parameter is maintained. As described above with respect to establishing an account, the rebalancing is performed by the optimization system 44. Account position data for each individual account is transmitted from the accounting system 42 to the optimization system 44, which selects securities to be traded based on capitalization weight and industry balance parameters.

As noted above, each selected individual account is also evaluated for purposes of harvesting tax losses. To evaluate tax lots, the stored historical values for each security in an individual account is compared to the market value by the optimization system 44. If losses in the value of a given tax lot exceed a predetermined threshold, the optimization system 44 selects the security in the tax lot to be traded and transmits data identifying the securities to be traded to the trading system 46. Based on the industry balance parameter, the optimization system 44 further selects replacement securities to be held in the portfolio until the next tax loss harvesting process is conducted for the identified individual portfolio. Traded securities which are held in the portfolio based on capitalization weighting in the index are repurchased in the next tax loss harvesting procedure.

Data indicating the securities selected to be traded is transmitted to the trading system 46. Trade data is preferably stored until all of the accounts have been rebalanced and tax loss harvested, such that a single block trade of all of a specific security can be transmitted. Preferably, the trading system 46 compiles the trades to execute a single trade for a single security. However, it will be apparent to one of ordinary skill in the art that this function could be provided in the optimization system 44 or elsewhere in the overall system. Furthermore, depending on the method used for processing accounts, block trades could be made periodically as the accounts are rebalanced or evaluated for tax loss harvesting purposes. As noted above, the step of forming block trades minimizes the brokerage fees associated with each account.

To execute a trade, trade orders are transmitted from the trading system 46 to an external trading interface 50. The trading interface 50 completes the trade, and executed trade information is then transmitted back to the trading system 46. The trading system 46 in turn transmits this data back to the accounting system 42, along with brokerage fee information. The accounting system 42 then allocates the trade and brokerage fee information to each of the individual accounts.

Although an accounting system comprising a plurality of individual computers has been described, it will be apparent to one of ordinary skill in the art that the described system could be implemented in a single computer. Furthermore, many of the described functions could be combined or separated to provide different functional blocks executed by different computers or software routines.

Furthermore, while preferred embodiments have been illustrated and described, it should be understood that changes and modifications can be made thereto without departing from the invention in its broadest aspects. Various features of the invention are defined in the following claims.

We claim:

1. A method for passively managing an investment portfolio comprising a plurality of securities and for actively managing tax lots to automatically maximize investor wealth, the method comprising steps of:

constructing the investment portfolio to substantially track the performance of a selected index;

periodically rebalancing the investment portfolio to assure continued tracking of the selected index;

periodically calculating a difference between a present value and a past value for each of the plurality of securities comprising the investment portfolio;

automatically trading the securities from the investment portfolio to harvest tax losses when the difference between the present value and the past value of the security is substantially equivalent to a predetermined tax loss threshold; and automatically delaying at least a period of time required by Internal Revenue Service Wash Sale Rules prior to repurchasing the securities sold to harvest tax losses.

2. The method as defined in claim 1, wherein the step of rebalancing further comprises steps of comparing a plurality of securities comprising the index to a capitalization weighting parameter, selecting the securities which exceed a capitalization threshold, comparing a resultant portfolio to an industry balance parameter, and adding securities which do not exceed the capitalization weighting parameter to the investment portfolio to provide an industry balance which is substantially equivalent to the industry balance parameter.

3. The method as defined in claim 1, wherein the step of constructing the portfolio further comprises steps of comparing a plurality of securities comprising the index to a capitalization weighting parameter, selecting the securities which exceed a capitalization threshold, comparing a resultant portfolio to an industry balance parameter, and adding securities which do not exceed the capitalization weighting parameter to the investment portfolio to provide an industry balance which is substantially equivalent to the industry balance parameter.

4. The method as defined in claim 1, wherein the predetermined tax loss threshold is in a range between about ten and about fifteen percent.

5. The method as defined in claim 1, wherein the predetermined tax loss threshold is approximately fifteen percent.

6. The method as defined in claim 1, wherein the time period between each successive rebalancing of the investment portfolio is at least equivalent to the time period required by the Internal Revenue Service Wash Sale Rules.

7. The method as defined in claim 1, wherein the index is the Standard and Poor's 500.

8. A method for providing a tax efficient portfolio to each of a plurality of investors, the method comprising steps of:

constructing an investment portfolio based on a capitalization weight parameter and an industry balance parameter, the investment portfolio comprising a plurality of securities selected to substantially track the performance a selected index;

establishing an individual portfolio for each of the plurality of investors wherein each investor owns shares in each security comprising the investment portfolio;

periodically determining a change in value between a present value and a past value of each security and comparing the change in value to a predetermined tax loss threshold to identify a tax harvest security;

combining the tax harvest securities from each of the plurality of investors' portfolios to form a block trade;

automatically rebalancing the investment portfolio to substantially track the selected index, wherein the investment portfolio is rebalanced based on the capitalization weight parameter and the industry balance parameter;

electronically trading the block trade and allocating the corresponding tax loss to each of the plurality of investors; and delaying a period of time required by Internal Revenue Service Wash Sale Rules before repurchasing the tax harvest securities.

9. The method as defined in claim 8, wherein the period of time between successive rebalancing steps is substantially equivalent to the period of time between successive tax harvesting steps.

10. The method as defined in claim 8, wherein the number of securities in the investment portfolio is less than the number of securities held in the selected index.

11. The method as defined in claim 8, wherein the capitalization weight parameter is defined as a minimum position size of about three tenths of one percent of the market value of the index.

12. The method as defined in claim 11, wherein the investment portfolio further comprises diversification securities which do not have a capitalization weight in the selected index which is substantially equivalent to the capitalization weight parameter, the diversification securities being selected to provide industry diversification.

13. The method as defined in claim 8, wherein a brokerage cost associated with the block trade is allocated among each of the investors.

14. The method as defined in claim 8, further comprising the step of allocating an individual position and an individual tax lot for each investor.

15. A method for cost-effectively providing a tax efficient investment portfolio to a plurality of investors with a range of account sizes comprising steps of:

constructing a plurality of individual investment portfolios wherein each investment portfolio comprises a plurality of securities selected to model and substantially track the performance of a selected index, the plurality of securities in each individual account being owned by an individual investor;

automatically optimizing each individual account by periodically calculating a difference between a present value and a past value of each security, comparing this difference to a predetermined loss threshold value, and designating each security which has a difference which is at least substantially equivalent to the predetermined threshold as a tax harvest security;

periodically rebalancing the investment portfolios based on a capitalization weight parameter and an industry balance parameter to substantially track the performance of the selected index, wherein at least one security is designated as rebalance security to be traded;

establishing at least one block trade comprising the tax harvest securities and the rebalanced securities from each individual account;

automatically trading the securities in the block trade;

allocating a brokerage cost to each of the individual accounts;

allocating a security position and a tax lot to each individual account; and periodically optimizing each individual account, wherein a time period between successive optimizations is at least equivalent to the time required by the Internal Revenue Service Wash Sale Rules.

16. The method as defined in claim 15, wherein the predetermined loss threshold is in the range of about ten percent to about fifteen percent.

17. The method as defined in claim 15, wherein the security position data and the tax lot data for each individual account is maintained in a computerized accounting system.

18. The method as defined in claim 15, further comprising the step of purchasing a security in the index to replace each tax harvest stock, wherein the security is selected to provide diversification based on the industry balance parameter.

* * * * *